Patented July 20, 1948

UNITED STATES PATENT OFFICE 2,445,553

PRESSURE-SENSITIVE ADHESIVE SHEET

Ellington M. Beavers, Philadelphia, Pa., assignor to The Resinous Products & Chemical Company, Philadelphia, Pa., a corporation of Delaware No Drawing. Application November 30, 1945, Serial No. 632,115

3 Claims. (Cl. 117—122)

This invention relates to a pressure-sensitive adhesive sheet or tape comprising a flexible backing coated with a layer of adhesive which is tacky on the surface and is securely bonded to the backing.

An object of this invention is to provide a pressure-sensitive adhesive sheet which is extremely durable, the adhesive of which is not subject to cold flow and is resistant to organic solvents, particularly hydrocarbon solvents. A further object is to provide adhesive sheets with adhesives of varying degrees of surface tackiness.

These objects are attained by coating a flexible backing material with a layer of an unsaturated, non-crystalline, curable, tacky, thermoplastic linear polyester which is capable of cross-linking and which has admixed therewith an organic peroxidic catalyst, and thereafter curing said layer at a temperature above 100° C. while the surface of said layer is exposed to oxygen.

By "pressure-sensitive adhesive sheet" is meant an article consisting of a flexible backing coated with an adhesive layer, the surface of which is tacky and does not require treatment with water, solvent, heat, or other agents in order to impart adhesiveness.

Pressure-sensitive adhesive sheets and tapes known heretofore have suffered from several disadvantages which it is the object of this invention to overcome. For example, the adhesives used in making adhesive sheets and tapes heretofore were usually combinations of several ingredients such as rubber, thermoplastic resins, plasticizers, and the like. As a result, the viscosity, cohesiveness, and adhesiveness of such tapes varied widely with changes in temperature and on aging. The adhesive often became brittle at winter temperatures and/or objectionably sticky at summer temperatures. In many instances, the viscosity and the adhesiveness of the layer of adhesive changed on aging or at elevated temperatures with the result that the rolls of tape became deformed and the layers stuck together with such tenacity that they could not be separated without rupturing the adhesive layer, or backing, or both.

These and other disadvantages are overcome by this invention. Flexible backing materials are first coated with films or layers of a mixture of an unsaturated, non-crystalline, tacky, thermoplastic linear polyester capable of cross-linking and a peroxidic catalyst. The film is then cured in the presence of oxygen. The polyester is thus converted to an infusible and insoluble layer which adheres very tenaciously to the backing and, at the same time, has a tacky surface. By curing the layer in the presence of oxygen, the curing of the surface of the polyester is inhibited; and, while the layer remains tacky, it is cured sufficiently to insure its having the necessary cohesive strength to prevent smearing. The remainder of the film is converted to the insoluble and infusible condition. Thus, there is obtained a tape which is tacky on the surface, as pressure-sensitive adhesives must be, but is extremely durable, stable, and resistant to solvents because the remainder of the adhesive layer is in the "cured" condition.

The linear polyesters which are employed in making such a desirable product are those prepared by the esterification of 1,2-propylene glycol, a saturated unsubstituted aliphatic dicarboxylic acid such as sebacic acid, and an unsaturated dicarboxylic acid such as maleic. Such polyesters are essentially of the linear or two-dimensional type and are partially unsaturated due to the presence of the double bond in the residue of the esterified unsaturated acid. These double bonds impart to the polyesters the ability to cross-link, under the influence of heat and/or a catalyst, and to form thereby three-dimensional polymers which are no longer thermoplastic. The conversion of the two-dimensional linear polymers to the three-dimensional polymers is commonly known as curing.

The polyesters which are employed herein are linear polyesters of relatively high molecular weight containing alternate chains from dicarboxylic acids and 1,2-propylene glycol, the chains from the dicarboxylic acids in the linear polyesters consisting of a major proportion of chains from a saturated dicarboxylic acid having a chain length of at least four carbon atoms and carboxyl groups as the sole reactive functional groups and a minor proportion of chains from an $\alpha,\beta$-unsaturated dicarboxylic acid.

The polyester may be made by well-known methods. The preferred process of manufacture comprises heating a saturated dicarboxylic acid, an unsaturated dicarboxylic acid, and an excess of a dihydric alcohol in the presence of an acid catalyst such as zinc chloride. In the first stages of the reaction, esterification takes place with the elimination of water. Thereafter, condensation occurs with the splitting out and removal of the excess glycol. In this way, polyesters having high molecular weights may be prepared in a minimum of time.

The saturated dicarboxylic acids which are preferred are those aliphatic acids having at least two carbon atoms between the carboxyl groups or a total of at least four carbon atoms including the carbon atoms of the carboxyl groups. Furthermore, the dicarboxylic acids of first choice do not contain any groups, other than the carboxyl groups, which are reactive under the conditions employed in the formation of the linear polyesters. They may thus be described as "unsubstituted," and the word "unsubstituted" is used in that sense here and elsewhere throughout this specification. Thus, succinic, adipic, $\alpha$-methyl glutaric, pimelic, suberic, azelaic, sebacic, and higher acids may be used. Sebacic acid is particularly satisfactory and is preferred. Mixtures of saturated acids, such as a mixture of sebacic and adipic acids, may also be employed.

Suitable α,β-unsaturated dicarboxylic acids are those which are unsubstituted and which combine, as do the saturated dicarboxylic acids, to form linear polyesters made up of alternating residues of the dicarboxylic acids and dihydric alcohols. Included as operable are maleic, fumaric, citraconic, and mesaconic acids. Maleic acid is much preferred, and it may be used in the form of its anhydride or a lower aliphatic ester which reacts by transesterification. The amount of unsaturated acid which is used has a marked effect upon the properties of the polyester. As indicated above, the presence of the double bonds in the residue of the esterified unsaturated acid imparts to the resin the capacity for forming "cross-linkages," resulting in conversion to three-dimensional polymers. It is convenient and customary to express the amount of unsaturated acid as a molar percentage of the total acids present, and this system has been adopted herein. The amount of unsaturated acid employed will depend largely upon the properties to be attained in the finished polyester and upon the conditions of operation. In a general way, the maximum molecular weight obtainable in an essentially linear polyester, other factors being constant, will vary inversely with the amount of unsaturated acid employed. In cases where a resin of extremely high molecular weight (for example, 100,000) is prepared, the amount of unsaturated acid employed is very low and may be as low as 0.1% of the total acids used. However, the amount ordinarily used is above 1%. The maximum amount is about 20%. For most applications, an amount between about 1% and about 6% is much preferred because this proportion of unsaturated acid assures a sufficiently high degree of unsaturation in the polyester to permit cross-linking and also permits the esterification to proceed until the product has a sufficiently high molecular weight.

The molecular weight of the polyester, which is the essential ingredient of the adhesive used herein, may be conveniently estimated from viscosity measurements and the use of Staudinger's formula as given in his book "Die Hochmolekularen Organischen Verbindungen" (1932 Berlin). The polyesters employed in this invention may have molecular weights as low as 5000 and as high as about 100,000, but those having a molecular weight from about 8000 to about 20,000 are preferred because they may be used without further modification with hardening or plasticizing agents.

The catalysts which may be used are organic peroxidic compounds such as benzoyl peroxide, acetyl peroxide, acetone peroxide, tert.-butyl hydroperoxide, di-tert.-butyl peroxide, the barium salt of tert.-butyl hydroperoxide, di-tert.-butyl diperphthalate, tert.-butyl perbonzoate, and the like. Definite preference is given to those catalysts which contain a tertiary butyl group attached to a peroxidic oxygen atom because the adhesive sheets so prepared have better aging characteristics than those catalyzed with acyl peroxides. The amounts of these catalysts which are used are from about 0.5% to about 5%, depending upon the particular catalyst and the degree of unsaturation of the particular polyester. Ordinarily, an amount of catalyst from about 1% to about 3% is preferred.

The mixture of curable, tacky linear polyester may be applied to the backing by such methods as roller-coating, spraying, knifing, and the like. The mixture may be applied in the undiluted form, in which case it is conveniently warmed in order to reduce its viscosity. Or it may be applied in the form of a solution in organic solvents, in which case the solvent is allowed to evaporate or is driven off during the curing step. Suitable solvents comprise hydrocarbons such as benzol, xylol, toluol, hydro-aromatic solvents such as "Solvesso #2," ketones such as acetone, esters such as ethyl acetate, and chlorinated hydrocarbons such as ethylene dichloride. Hydrocarbons are preferred. One advantage in using this type of adhesive is that very highly concentrated solutions may be applied, and a relatively thick layer of adhesive can be laid down in a single operation, in contrast to other adhesives containing rubber, which can be applied only in the form of relatively dilute solutions.

The backing materials may vary widely from flexible, impervious metal foils to thin, porous sheets of paper. Among the suitable backing materials are textiles of varying degrees of thickness and perviousness, including glass cloth, sheets of regenerated cellulose typified by Cellophane, paper such as kraft, wrapping, crepe, tissues, and the like. One of the advantages of this type of adhesive is that it can be applied in the form of a solution which, even at high concentrations, can thoroughly impregnate a pervious backing, if desired.

During the heating, the layer of adhesive is maintained in an atmosphere containing oxygen. In most cases, it is sufficient to conduct the heating in air, although higher concentrations of oxygen are recommended when adhesives which cure very rapidly are employed.

The following examples are illustrative of this invention:

A. Into a three-necked flask equipped with a mechanical stirrer, thermometer, and reflux condenser were charged 354 grams of sebacic acid, 43 grams of maleic anhydride, 208 grams of 1,2-propylene glycol, and 0.4 gram of zinc chloride. The mixture was stirred and heated to 200° C., at which point is was held for six hours. During this period, the pressure was gradually lowered to 50 mm. of mercury. The condenser was replaced with a simple gooseneck, and the pressure was reduced to 5 mm. After being heated at 200 C. under a 5 mm. pressure for four hours, the batch was cooled.

The resulting polyester had an acid number of 1.6 and a viscosity, when measured as a 50% solution in ethylene dichloride, of U on the Gardner-Holdt scale.

B. A 50% solution of the resulting polyester was prepared in a hydrocarbon solvent known as "Solvesso #2." To this solution was added 2% of benzoyl peroxide, calculated on the weight of polyester in solution. This solution was flowed out on strips of Cellophane and kraft paper by means of a Film-O-Graph, which laid down a wet film 25 mils in thickness. The strips were placed in an oven at 125° C. for twenty minutes. The oven was equipped with a fan, which drew in and circulated air over the surfaces of the coated strips. The strips were then removed from the oven and cooled. The coated strips were found to be tacky on the surface but otherwise well cured. The adhesion of the polyester to the backing materials was extremely tenacious and, particularly in the case of the kraft paper strips, it was evident that the paper had been thoroughly impregnated.

C. The strips were applied by pressure of the hand to various surfaces, including steel, wool, glass, Holland cloth, and Plexiglas, the last being a sheet of an acrylic plastic. In all cases, the tape could be stripped off cleanly without leaving the slightest smudge.

Strips were repeatedly affixed and removed from a sheet of glass, and it was found that this could be repeated at least twelve times without the slightest evidence of smearing of the glass or a lowering of adhesion. Other strips were affixed to glass sheets and placed in an oven at 45° C. for twenty hours. At the end of this time, the tape stripped cleanly from the glass.

D. Tapes were prepared by coating strips of aluminum foil and glass cloth (Fiberglas ECC-11-162) in the manner described in B above. These tapes, like those in C above, had good adhesion to many different surfaces.

E. Tapes were prepared by coating strips of Cellophane in the manner described in B above. These were immersed in gasoline (Standard Reference Fuel #6) for twenty-four hours, together with strips of commercial Cellophane tape as standards. The commercial tape swelled to a considerably greater extent than did the tapes of this invention; and, when the tapes were dried in air, the products of this invention were found to have much better adhesion than the commercial tape.

Strips of the two tapes were pressed on glass, and the pieces of glass were immersed in gasoline for twenty-four hours. On removal of the pieces of glass from the gasoline, the tapes were stripped therefrom. The tape made as described above stripped cleanly from the glass, whereas the commercial tape left a film or smear of adhesive on the glass.

It is apparent from the above examples that unusual pressure-sensitive adhesive sheets or tapes result from this invention. Not only is the surface of the adhesive sheet sufficiently tacky to insure adequate adhesion to dry surfaces, but the cohesive strength of the cured polyester is so high as to prevent splitting or "picking" of the adhesive layer. Furthermore, the adhesion of the adhesive layer is so great, due to the curing of the film in contact with the backing, that there is no separation of adhesive and backing. The adhesive layer is resistant to solvents which cause swelling of many adhesives formerly employed. In addition, the adhesive layer does not soften at summer temperatures and does not flow under such conditions. Durability depends in part upon the choice of curing catalyst, and the most durable products are those catalyzed by the group II metal salts of tertiary butyl hydroperoxide, of which the calcium, barium, and strontium salts are typical.

While all of the sheets or tapes of this invention are characterized by the above properties, they may be varied slightly in such properties as toughness and tackiness by changing the ratios of ingredients and the curing treatment. Thus, by varying the amount of catalyst, the temperature of cure, and the concentration of oxygen, there may be prepared adhesive sheets varying in tackiness from those described as very sticky to those having only a very slight tack. Also, they may be modified with such materials as mineral oil, high-boiling ester plasticizers, rosin, extenders, and pigments. Modification is often desirable when the molecular weight is outside the preferred range of 8000 to 20,000.

I claim:

1. A pressure-sensitive adhesive sheet, which is flexible and will conform to a surface against which it is pressed, which comprises a flexible backing to which is securely anchored an insoluble resinous coating having a tacky surface and the remainder in an infusible state, said resinous coating being the product resulting from heating at a temperature of 100° C. to 225° C. in contact with said backing and with oxygen a mixture of 0.5 to five parts of a peroxidic curing agent and one hundred parts of a tacky, non-crystalline, linear polyester having a molecular weight from about 8000 to 20,000 and containing alternate chains from dicarboxylic acids and 1,2-propylene glycol, the chains of the dicarboxylic acids in the linear polyester consisting of 80% to 99% of chains from sebacic acid and 20% to 1% of chains from maleic acid.

2. A pressure-sensitive adhesive sheet, which is flexible and will conform to a surface against which it is pressed, which comprises a flexible backing to which is securely anchored an insoluble resinous coating having a tacky surface and the remainder in an infusible state, said resinous coating being the product resulting from heating at a temperature of 100° C. to 225° C. in contact with said backing and with oxygen a mixture of one to three parts of a peroxidic curing agent and one hundred parts of a tacky, non-crystalline, linear polyester having a molecular weight from about 8000 to 20,000 and containing alternate chains from dicarboxylic acids and 1,2-propylene glycol, the chains of the dicarboxylic acids in the linear polyester consisting of 94% to 99% of chains from sebacic acid and 6% to 1% of chains from maleic acid.

3. A pressure-sensitive adhesive sheet, which is flexible and will conform to a surface against which it is pressed, which comprises a flexible backing to which is securely anchored an insoluble resinous coating having a tacky surface and the remainder in an infusible state, said resinous coating being the product resulting from heating at a temperature of 100° C. to 225° C. in contact with said backing and with oxygen a mixture of 0.5 to five parts of a peroxidic curing agent and one hundred parts of a tacky, non-crystalline, linear polyester having a molecular weight from about 5000 to 100,000 and containing alternate chains from dicarboxylic acids and 1,2-propylene glycol, the chains of the dicarboxylic acids in the linear polyester consisting of 80% to 99% of chains from sebacic acid and 20% to 1% of chains from maleic acid.

ELLINGTON M. BEAVERS.

REFERENCES CITED

The following references are of record in the file of this patent:

UNITED STATES PATENTS

| Number | Name | Date |
|---|---|---|
| 2,299,547 | Letteron | Oct. 20, 1942 |
| 2,322,756 | Walder | June 29, 1943 |
| 2,360,252 | Malm et al. | Oct. 10, 1944 |
| 2,363,581 | Frosch | Nov. 28, 1944 |
| 2,379,248 | Muskat | June 26, 1945 |

OTHER REFERENCES

"Ind. & Eng. Chem.," of November 1937, pages 1267-1269.